(12) United States Patent
Shen et al.

(10) Patent No.: US 11,398,981 B2
(45) Date of Patent: Jul. 26, 2022

(54) PATH CREATION METHOD AND DEVICE FOR NETWORK ON CHIP AND ELECTRONIC APPARATUS

(71) Applicant: LYNXI TECHNOLOGIES CO., LTD., Beijing (CN)

(72) Inventors: Yangshu Shen, Beijing (CN); Luping Shi, Beijing (CN); Yaolong Zhu, Beijing (CN)

(73) Assignee: LYNXI TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 17/418,336

(22) PCT Filed: Nov. 28, 2019

(86) PCT No.: PCT/CN2019/121519
§ 371 (c)(1),
(2) Date: Jun. 25, 2021

(87) PCT Pub. No.: WO2020/134827
PCT Pub. Date: Jul. 2, 2020

(65) Prior Publication Data
US 2022/0045948 A1    Feb. 10, 2022

(30) Foreign Application Priority Data

Dec. 28, 2018   (CN) .......................... 201811619532.8

(51) Int. Cl.
*H04L 45/74* (2022.01)
*H04L 41/0803* (2022.01)

(52) U.S. Cl.
CPC .......... *H04L 45/74* (2013.01); *H04L 41/0803* (2013.01)

(58) Field of Classification Search
CPC ........................... H04L 45/74; H04L 41/0803
See application file for complete search history.

(56) References Cited

U.S. PATENT DOCUMENTS 8,185,896 B2 * 5/2012 Arimilli ................ G06F 9/5061
                                                    718/100
8,848,703 B2 * 9/2014 Sano .................. G06F 15/17381
                                                     370/389
(Continued)

FOREIGN PATENT DOCUMENTS

CN    101233731 A    7/2008
CN    101488922 A    7/2009
(Continued)

OTHER PUBLICATIONS

China Patent Office, First Office Action dated Sep. 3, 2021 for application No. CN201811619532.8.
(Continued)

*Primary Examiner* — Saad A. Waqas
(74) *Attorney, Agent, or Firm* — Li & Cai Intellectual Property (USA) Office

(57) ABSTRACT

Provided are a path creation method and device for a network on chip and electronic apparatus. The method includes: receiving, by a second network node, a first data packet sent by a first network node, the first data packet carrying first idle address identification information, a destination network node address and path creation identification information, the first idle address identification information indicating a first idle position in a first path routing table of the first network node, the path creation identification information indicating a creation of a path; storing, by the second network node, the first idle address identification information in a second idle position in its second path routing table, and determining second idle address identification information; determining, by the second network node, a second data packet according to the second idle address identification information; and sending, by the second network node, the second data packet.

10 Claims, 9 Drawing Sheets

(56) References Cited

U.S. PATENT DOCUMENTS

| | | | |
|---|---|---|---|
| 9,244,880 B2* | 1/2016 | Philip | G06F 15/17312 |
| 10,795,826 B2* | 10/2020 | Fang | G06F 12/128 |
| 2001/0025377 A1 | 9/2001 | Hinderks | |
| 2014/0321465 A1 | 10/2014 | Chang | |
| 2015/0319086 A1* | 11/2015 | Tripathi | H04L 45/02 |
| | | | 370/254 |
| 2016/0164774 A1 | 6/2016 | Besaw et al. | |
| 2018/0225156 A1 | 8/2018 | Lu et al. | |

FOREIGN PATENT DOCUMENTS

| | | | |
|---|---|---|---|
| CN | 103107943 A | 5/2013 | |
| CN | 103973482 A | 8/2014 | |
| CN | 103986664 A | 8/2014 | |
| CN | 1040655 A | 9/2014 | |
| CN | 104202253 A | 12/2014 | |
| CN | 104243326 A | 12/2014 | |
| CN | 104539533 A | 4/2015 | |
| CN | 105450555 A | 3/2016 | |

OTHER PUBLICATIONS

Lulu Li: "Research on Fault Tolerant Technology for Networks-on-Chip", Computer Science, vol. 45 No 3, Mar. 31, 2018.
WIPO, International Search Report dated Jan. 2, 2020.

* cited by examiner

PATH CREATION METHOD AND DEVICE FOR NETWORK ON CHIP AND ELECTRONIC APPARATUS

CROSS-REFERENCE TO RELATED APPLICATIONS

The present application is a National Phase Application filed under 35 U.S.C. 371 as a national stage of PCT/CN2019/121519, filed on Nov. 28, 2019, an application claiming priority from Chinese Patent Application No. 201811619532.8, filed on Dec. 28, 2018 in the Chinese Intellectual Property Office and titled "PATH CREATION METHOD AND DEVICE FOR NETWORK ON CHIP AND ELECTRONIC APPARATUS", the content of which is hereby incorporated herein by reference in its entirety.

TECHNICAL FIELD

The present disclosure relates to the field of communication technology, and more particularly, to a path creation method and device for a network on chip and an electronic apparatus.

BACKGROUND

With the development of artificial intelligence technology, users' requirement to chip processing capability is increased. Due to a limited processing capability of a single-core chip, many-core chips are used more and more widely. In many-core chip design, a Network on Chip (NOC) is used to implement communication between cores. Therefore, a performance of the NOC is a key performance of a many-core chip.

In the related art, the NOC is used for communication between cores by the many-core chip. For example, a specific method for sending a data packet to a slave data receiving unit (Slave, S) by a master data sending unit (Master, M) includes: first, M adds an address of a destination core to a header of the data packet, M then sends the data packet to an intermediate network node (Node, n) connected thereto according to a path routing table saved by itself, and n sends the data packet to S directly or through other intermediate network node(s) according to a path routing table saved by itself. When performing the above data transmission, all of the cores need to be addressed uniformly, each of the cores needs to save a pre-configured static path routing table, and the path routing table needs to support routing requirements of all scenarios simultaneously. Therefore, an overhead of the path routing table is huge.

SUMMARY

In view of this, the present disclosure provides a path creation method and device for a network on chip and an electronic apparatus, to solve a problem that the overhead of the path routing table is huge when the NOC is used for communication between the cores by the many-core chip in the related art.

According to a first aspect of embodiments of the present disclosure, provided is a path creation method for an network on chip, including: receiving, by a second network node, a first data packet sent by a first network node, the first data packet carrying first idle address identification information, a destination network node address and path creation identification information, the first idle address identification information indicating a first idle position in a first path routing table of the first network node, the path creation identification information indicating a creation of a path; storing, by the second network node, the first idle address identification information in a second idle position in its second path routing table, and determining second idle address identification information, the second idle address identification information being address information of the second idle position in the second network node; determining, by the second network node, a second data packet according to the second idle address identification information; and sending, by the second network node, the second data packet.

In an embodiment, before the step of storing, by the second network node, the first idle address identification information in the second idle position in its second path routing table, and determining the second idle address identification information, the method may further include: determining, by the second network node, the second idle position in the second path routing table.

In an embodiment, the step of determining, by the second network node, the second data packet according to the second idle address identification information, may include: determining, by the second network node, the second idle address identification information, the destination network node address and the path creation identification information as the second data packet.

In an embodiment, the stop of sending, by the second network node, the second data packet, may include: determining, by the second network node, a transmission direction of the second data packet according to the destination network node address; and sending, by the second network node, the second data packet according to the transmission direction.

In an embodiment, after the step of sending, by the second network node, the second data packet, the method may further include: receiving, by the second network node, a third data packet sent by a third network node, the third data packet carrying third idle address identification information, the second idle address identification information and response identification information, the third idle address identification information indicating a third idle position in a third path routing table of the third network node, the response identification information indicating a response to the path creation identification; determining, by the second network node, the second idle position in the second path routing table according to the second idle address identification information; storing, by the second network node, the third idle address identification information in the second idle position in the second path routing table; determining, by the second network node, a fourth data packet according to the second idle position; and sending, by the second network node, the fourth data packet.

In an embodiment, the step of determining, by the second network node, the fourth data packet according to the second idle position may include: determining, by the second network node, the fourth data packet according to the first idle address identification information stored in the second idle position.

In an embodiment, the step of determining, by the second network node, the fourth data packet according to the first idle address identification information stored in the second idle position may include: determining, by the second network node, the first idle address identification information, the second idle address identification information and the response identification information as the fourth data packet.

In an embodiment, the path routing table may be stored in a register or in a random access memory.

According to a second aspect of embodiments of the present disclosure, provided is a path creation device for a network on chip, including: a receiving unit configured to receive a first data packet sent by a first network node, the first data packet carrying first idle address identification information, a destination network node address and path creation identification information, the first idle address identification information indicating a first idle position in a first path routing table of the first network node, the path creation identification information indicating a creation of a path; a storing unit configured to store the first idle address identification information in a second idle position in its second path routing table, and determine second idle address identification information, the second idle address identification information being address information of the second idle position in the second path routing table; a determining unit configured to determine a second data packet according to the second idle address identification information; and a sending unit configured to send the second data packet.

In an embodiment, the receiving unit is further configured to receive a third data packet sent by a third network node, the third data packet carrying third idle address identification information, second idle address identification information and response identification information, the third idle address identification information indicating a third idle position in a third path routing table of the third network node, the response identification information indicating a response to the path creation identification; the determining unit is further configured to determine the second idle position in the second path routing table according to the second idle address identification information; the storing unit is further configured to store the third idle address identification information in the second idle position in the second path routing table; the determining unit is further configured to determine a fourth data packet according to the second idle position; and the sending unit is further configured to send the fourth data packet.

According to a third aspect of embodiments of the present disclosure, provided is an electronic apparatus, including: a plurality of processing cores; and a network on a chip configured to exchange data between the plurality of processing cores and external data, an instruction being stored in the plurality of processing cores, and the electronic apparatus executing the method according to the first aspect or any one of possible methods in the first aspect according to the instruction.

According to a fourth aspect of embodiments of the present disclosure, provided is a computer-readable storage medium storing a computer program instruction thereon, which is executed by a processor to implement the method according to the first aspect or any one of possible methods in the first aspect.

According to a fifth aspect of embodiments of the present disclosure, provided is a computer program product, which, when run on a computer, causes the computer to implement the method according to the first aspect or any one of possible methods in the first aspect.

BRIEF DESCRIPTION OF THE FIGURES

The above and other objectives, features and advantages of the present disclosure will be apparent from the following description of embodiments of the present disclosure with reference to the accompanying drawings, in which.

DETAILED DESCRIPTION

The present disclosure will be described below based on embodiments, but is not limited to these embodiments. In the following detailed description of the present disclosure, some specific details are described in detail. Those having ordinary skill in the art can fully understand the present disclosure without the description of these details. In addition, those having ordinary skill in the art should understand that the accompanying drawings provided herein are for illustrative purposes.

Similar words such as "including", "include", "comprising" and "comprise" in the present disclosure should be interpreted as inclusive rather than exclusive or exhaustive meaning, unless clearly required otherwise in the context. In other words, it means "including but not limited to".

In the description of the present disclosure, it should be understood that terms "first", "second" and the like are only used for descriptive purposes without representing a sequence, and cannot be understood as indicating or implying relative importance. In addition, in the description of the present disclosure, expression "a plurality of" means two or more, unless otherwise specified.

Figure 1:
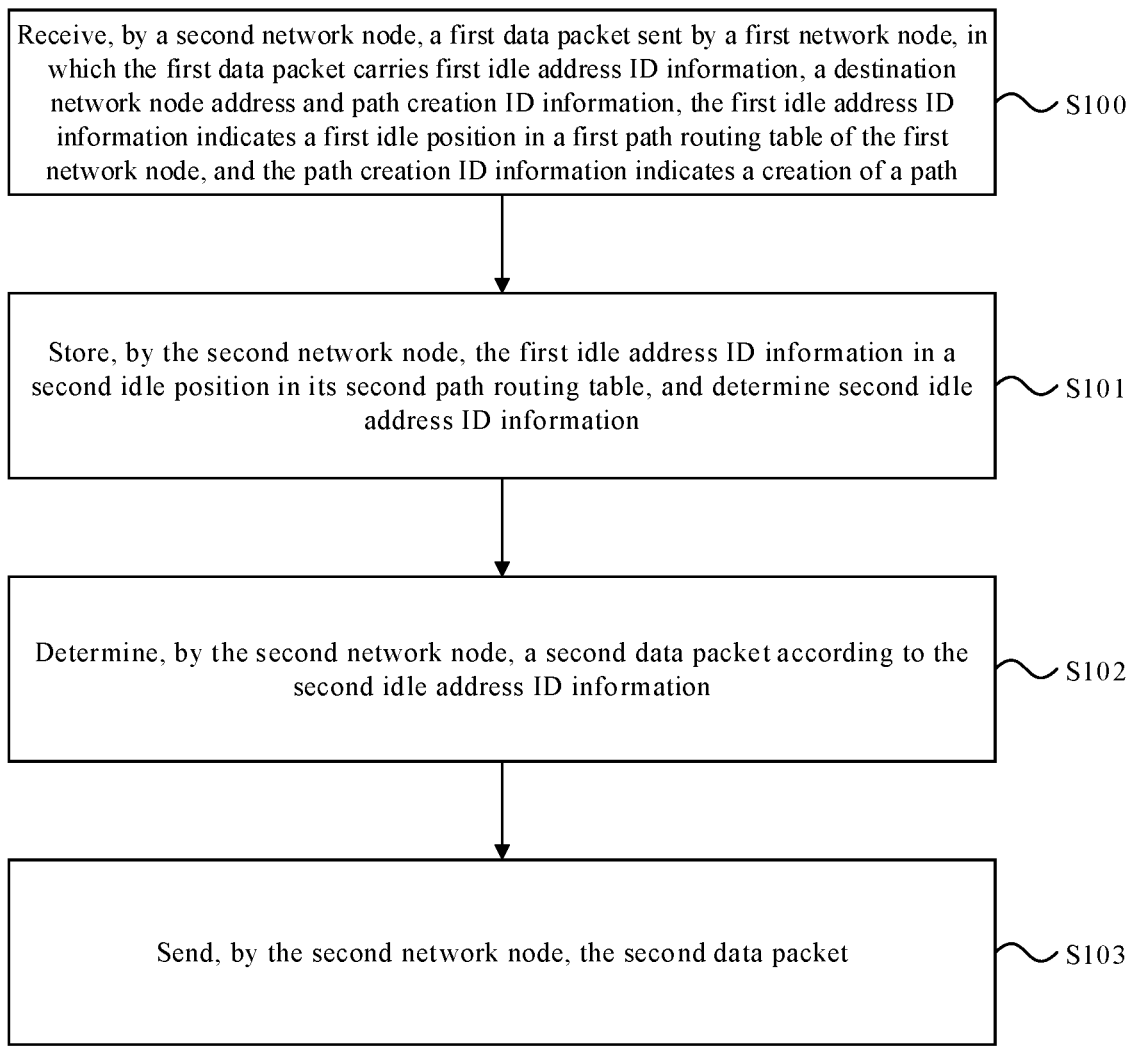
FIG. 1 is a flowchart of a path creation method for a network on chip according to an embodiment of the present disclosure.

A path creation method for a network on chip according to the present disclosure, as shown in FIG. 1, includes steps S100 to S103.

At step S100, a first data packet sent by a first network node is received by a second network node, the first data packet carries first idle address identification information, a destination network node address and path creation identification information, the first idle address identification information indicates a first idle position in a first path routing table of the first network node, and the path creation identification information indicates a creation of a path.

Specifically, the second network node may be an intermediate network node or a slave data receiving unit, and the first network node may be an intermediate network node or a master data sending unit. When there is an idle position in the first path routing table, the first data packet may be sent to create a new path for data transmission. After the data transmission is completed, the created new path releases the idle position occupied by it to enable the released idle position to be used to create other path for data transmission.

For example, it is assumed that a path routing table of the master data sending unit M0 is the first path routing table, as shown in Table 1 below:

TABLE 1

| address ID information | whether forwarded by outlet 1 | address ID information of outlet 1 | whether forwarded by outlet 2 | address ID information of outlet 2 |
|---|---|---|---|---|
| 0 | sending/ not sending | 0/1/... | sending/ not sending | 0/1/... |
| 1 | sending | 0 | not sending | 1 |
| 2 | sending/ not sending | 0/1/... | sending/ not sending | 0/1/... |
| 3 | not sending | 1 | not sending | 0 |
| ... | ... | ... | ... | ... |

Where, the above table 1 is the path routing table before configuration. The path routing table is stored in a register or a random access memory. The address identification (ID) information may have a plurality of values, depending on the hardware situation. The number of outlets corresponding to the address ID information is determined according to the actual situation, which is not limited by the present disclosure.

Figure 2:
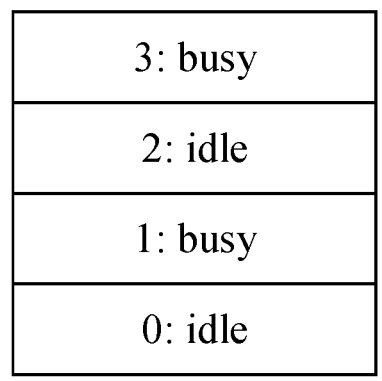
FIG. 2 is a schematic state diagram of a path routing table according to an embodiment of the present disclosure.

The address ID information in the above first path routing table may be in an idle state, and the address ID information in the idle state is called idle address ID information in the present disclosure. As an example, there are four configurable address ID information in the first path routing table, and the specific state of the path routing table may be as shown in FIG. 2. The positions with address ID information 0 and 2 are idle positions, and the positions with address ID information 1, 3 are busy positions. The busy address ID information indicates that a path occupies the position. In embodiments of the present disclosure, only the idle address ID information of the idle position may be called when creating a path.

The above table 1 is determined based on the situation shown in FIG. 2. Since the positions 1 and 3 are busy, indicating that paths have been set, the outlet sends the data and the corresponding address ID information may be determined. According to the embodiments of the present disclosure, a new path is created based on the idle position. When the positions with the address ID information of 0 and 2 are idle positions, outlets corresponding to 0, 2 in Table 1 and the address ID information corresponding to the outlets may be configured only after the new path is created, and data communication is performed according to the configured Table 1.

At step S101, the first idle address identification information is stored by the second network node in a second idle position in its second path routing table, and second idle address identification information is determined.

Optionally, before step S101, the method may further include determining a second idle position in the second path routing table by the second network node.

For example, it is assumed that the second network node is an intermediate network node N1, and the first network node is the master data sending unit M0. After receiving the first data packet, the intermediate network node N1 determines idle positions in its path routing table, and arbitrarily selects one of the idle positions to store the first idle address ID information in the first data packet. The selected idle position is called as the second idle position, and the address ID information corresponding to the second idle position is called as the second idle address ID information. The above process is represented by a schematic state diagram of the path routing table in FIG. 3, and the details are as follows: the master data sending unit M0 selects 0 in its path routing table as the first idle address ID information used to create the new path, so that the idle position corresponding to 0 is in a hold state, and the intermediate network node N1 selects its idle position 3 to receive the first data packet and save the first idle address ID information of the master data sending unit M0 in its idle position 3. For convenience, the first data packet is shown as A. The first data packet A carries 0 and is sent to the intermediate network node N1.

At step S102, a second data packet is determined by the second network node according to the second idle address identification information.

Specifically, the second network node determines the second idle address ID information and the path creation ID information as the second data packet.

Figure 3:
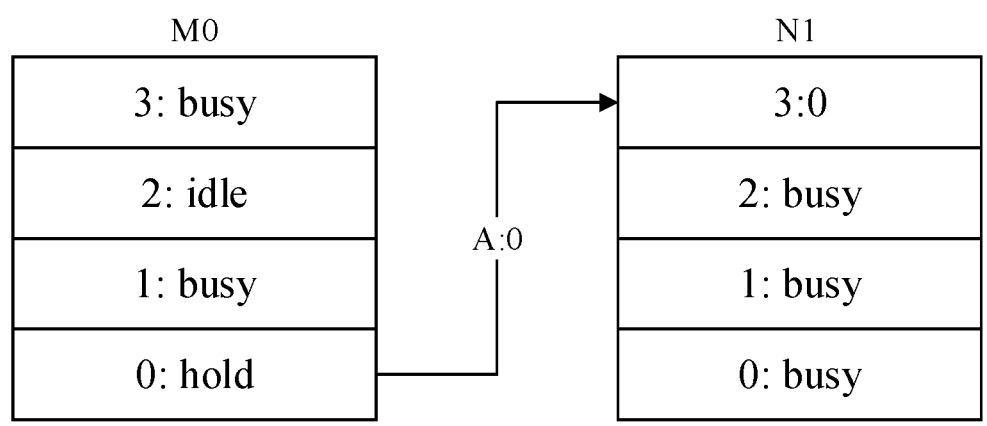
FIG. 3 is a schematic state diagram of another path routing table according to an embodiment of the present disclosure.

For example, 0 of the master data sending unit M0 is substituted with 3 of the intermediate network node N1 in FIG. 3, and then is determined as a new data packet together with the path creation ID information.

At step S103, the second data packet is sent by the second network node.

Specifically, the second network node determines a transmission direction of the second data packet according to the destination network node address, and sends the second data packet according to the transmission direction. The second path routing table may be similar to the above Table 1 and have a data transmission direction.

Optionally, when the transmission direction is determined according to the destination network node address, any addressing method in the related art may be used to determine intermediate network nodes passed through. For example, the destination network node address may be a relative address between the first network node and the destination network node, the destination network node may be modified every time one intermediate network node goes through, until the destination network node address is modified to a preset value, and a slave data receiving unit connected to the intermediate network node corresponding to the preset value is the destination network node.

In the embodiments of the present disclosure, first, the second network node receives the first data packet sent by the first network node, the first data packet carries the first idle address ID information and the path creation ID information, the first idle address ID information indicates the first idle position in the first path routing table of the first network node, the path creation ID information indicates the creation of the path, and then the second network node stores the first idle address ID information in the second idle position in its second path routing table and determines the second idle address ID information. The second network node then determines the second data packet according to the second idle address ID information, and finally the second network node sends the second data packet. Through the above method, the idle position in the path routing table may be used flexibly, and it is not required to configure all paths in the path routing table. The path is created through the idle position before data transmission, reducing the overhead of storing the path routing table in each node.

Figure 4:
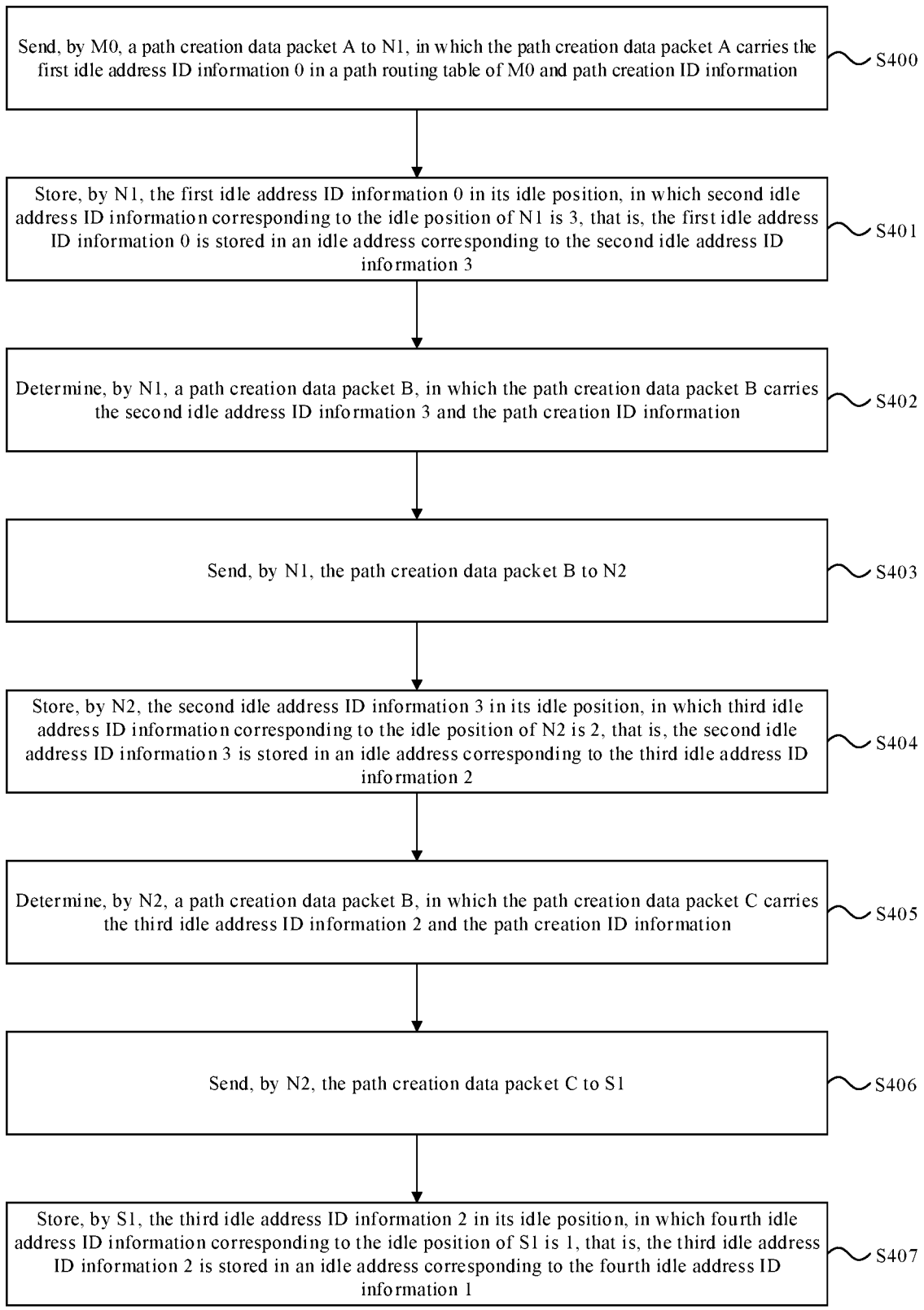
FIG. 4 is a flowchart of another path creation method for a network on chip according to an embodiment of the present disclosure.

The following describes a transmission process of the path creation data packet through a first implement. It is assumed that a master data sending unit M0 initiates the path creation data packet, and the path creation data packet is sent to a slave data receiving unit S1 through intermediate network nodes N1 and N2. The transmission direction is determined according to path routing tables of M0, N1 and N2, and the transmission process of the path creation data packet is shown in FIG. 4.

At step S400, a path creation data packet A is sent to N1 by M0, the path creation data packet A carries first idle address ID information 0 in a path routing table of M0 and path creation ID information.

At step S401, the first idle address ID information 0 is stored by N1 in its idle position, and second idle address ID information corresponding to the idle position of N1 is 3, that is, the first idle address ID information 0 is stored in an idle address corresponding to the second idle address ID information 3.

At step S402, a path creation data packet B is determined by N1, and the path creation data packet B carries the second idle address ID information 3 and the path creation ID information.

At step S403, the path creation data packet B is sent to N2 by N1.

At step S404, the second idle address ID information 3 is stored by N2 in its idle position, and third idle address ID information corresponding to the idle position of N2 is 2, that is, the second idle address ID information 3 is stored in an idle address corresponding to the third idle address ID information 2.

At step S405, a path creation data packet C is determined by N2, and the path creation data packet C carries the third idle address ID information 2 and the path creation ID information.

At step S406, the path creation data packet C is sent to S1 by N2.

At step S407, the third idle address ID information 2 is stored by S1 in its idle position, and fourth idle address ID information corresponding to the idle position of S1 is 1, that is, the third idle address ID information 2 is stored in an idle address corresponding to the fourth idle position ID information 1.

Figure 5:
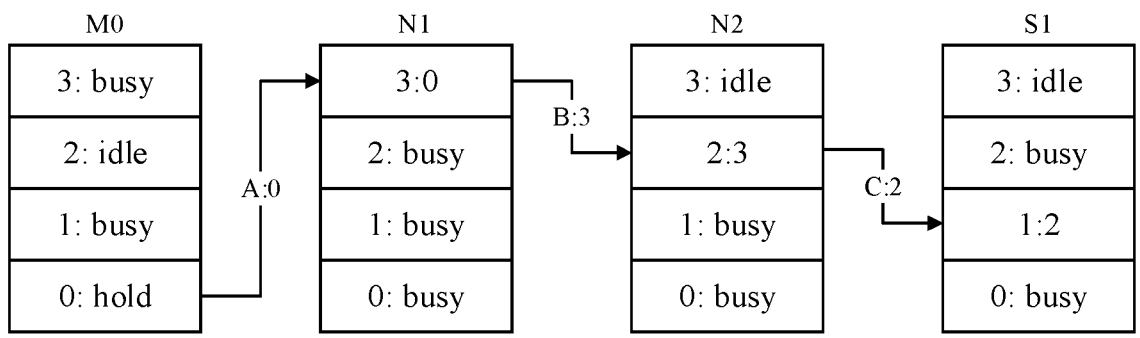
FIG. 5 is a schematic state diagram of yet another path routing table according to an embodiment of the present disclosure.

The above process may also be represented by a schematic state diagram of the path routing tables of M0, N1, N2, and S1 shown in FIG. 5.

Figure 6:
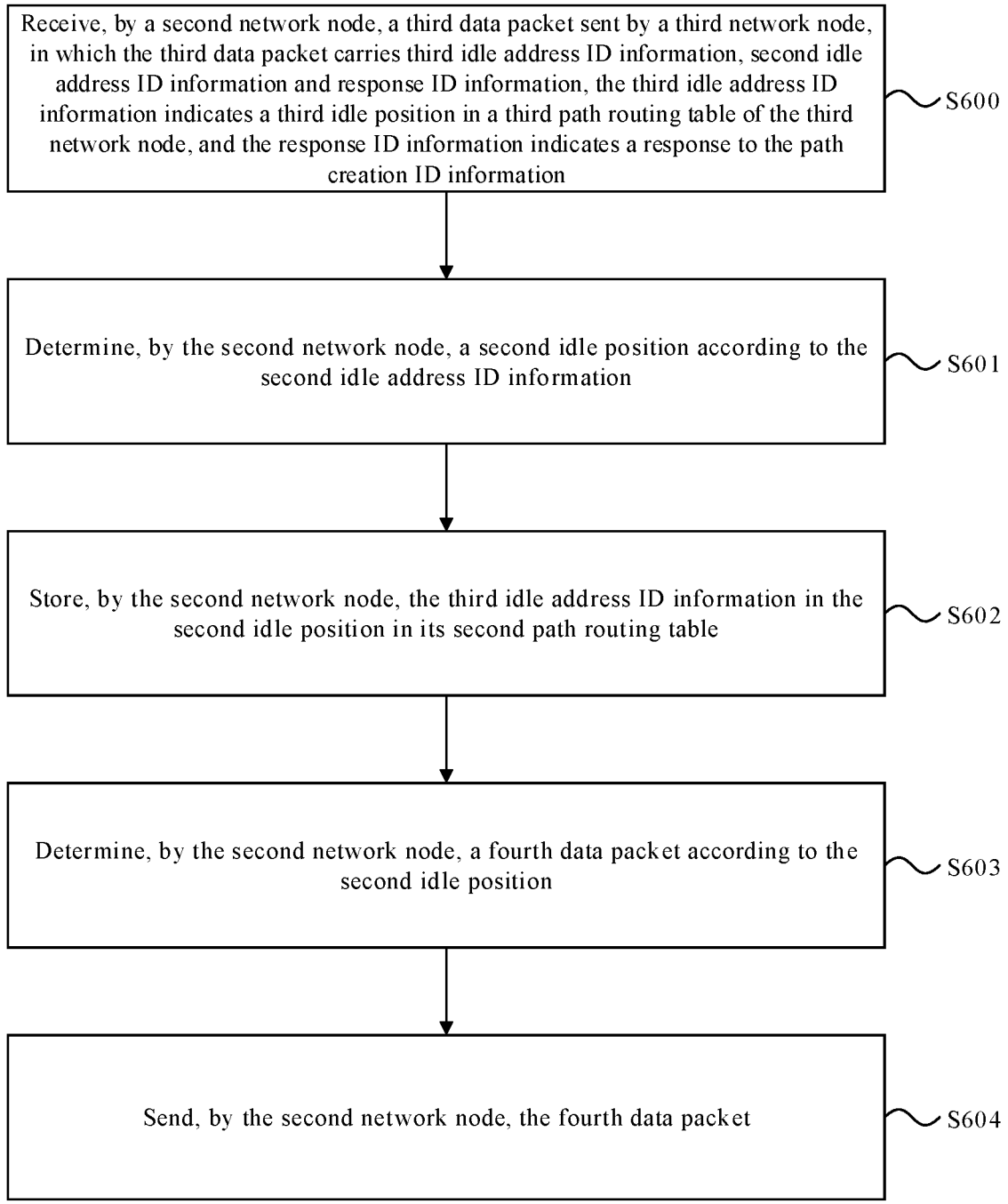
FIG. 6 is a flowchart of yet another path creation method for a network on chip according to an embodiment of the present disclosure.

In the embodiments of the present disclosure, after receiving the path creation data packet, the slave data receiving unit may send a response data packet to the master data sending unit, and the response data packet is sent to the master data sending unit through the intermediate network nodes. For this, the present disclosure provides another path creation method for an network on chip, as shown in FIG. 6, including steps S600 to S604.

At step S600, a third data packet sent by a third network node is received by the second network node, the third data packet carries third idle address identification information, the second idle address identification information, and response identification information, the third idle address identification information indicates a third idle position in a third path routing table of the third network node, and the response identification information indicating a response to the path creation identification information.

Specifically, the second network node may be an intermediate network node or a master data sending unit, and the third network node may be an intermediate network node or a slave data receiving unit.

Figure 7:
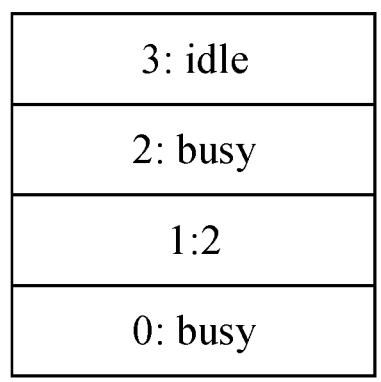
FIG. 7 is a schematic state diagram of still another path routing table according to an embodiment of the present disclosure.

It is assumed that the second network node is an intermediate network node, the third network node is a slave data receiving unit, and a schematic state diagram of the path routing table of the third network node is shown in FIG. 7. Since the idle address ID information carried in the path creation data packet is stored at the idle potion of the slave data receiving unit when the path creation data packet is received, two pieces of idle address ID information may be determined from the schematic state diagram of the path routing table of the third network node. It is assumed that the idle address ID information carried in the received path creation data packet is 2, and the idle address ID information of the third network node is 1, the above 2, 1 and the response ID information are determined as the response data packet, the response data packet is sent to an intermediate network node connected to the third network node according to a transmission direction, and the transmission direction is determined according to a path routing table similar to Table 1.

At step S601, a second idle position is determined by the second network node according to the second idle address identification information.

Specifically, the second network node finds its corresponding second idle position according to the second idle address ID information.

At step S602, the third idle address identification information is stored by the second network node in the second idle position in its second path routing table.

At step S603, a fourth data packet is determined by the second network node according to the second idle position.

Specifically, the second network node determines the fourth data packet according to the first idle address ID information stored in the second idle position, the fourth data packet includes the first idle address ID information, the second Idle address ID information and the response ID information.

At step S604, the fourth data packet is sent by the second network node.

The following describes a transmission process of the response data packet through a second implement. The transmission process of the response data packet is the reverse of the transmission process of the path creation data packet described in the first implement. The response process is described in detail on the basis of the first implement.

Figure 8:
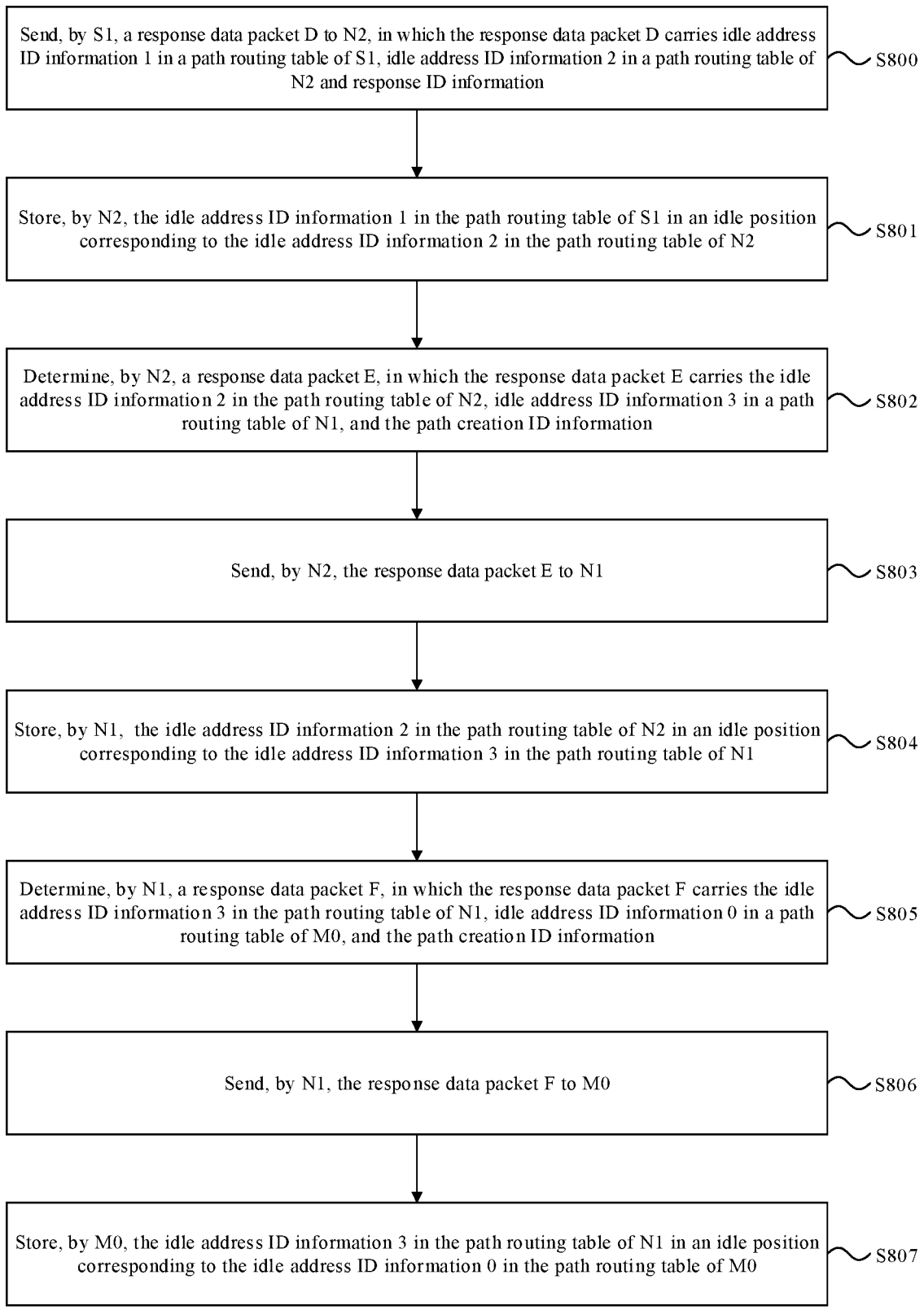
FIG. 8 is a flowchart of still another path creation method for a network on chip according to an embodiment of the present disclosure.

The slave data receiving unit S1 initiates the response data packet, and the response data packet is sent to the master data sending unit M0 through the intermediate network nodes N2 and N1. The transmission direction is determined according to the path routing tables of S1, N2 and N1. The redundant content will not be repeated in the description of the transmission of the response data packet, and the transmission of the response data is mainly described. The transmission of the response data packet is shown in FIG. 8.

At step S800, a response data packet D is sent to N2 by S1, the response data packet D carries idle address ID information 1 in a path routing table of S1, idle address ID information 2 in a path routing table of N2 and response ID information.

At step S801, the idle address ID information 1 in the path routing table of S1 is stored by N2 in an idle position corresponding to the idle address ID information 2 in the path routing table of N2.

At step S802, a response data packet E is determined by N2, the response data packet E carries the idle address ID information 2 in the path routing table of N2, idle address ID information 3 in a path routing table of N1, and the path creation ID information.

At step S803, the response data packet E is sent to N1 by N2.

At step S804, the idle address ID information 2 in the path routing table of N2 is stored by N1 in an idle position corresponding to the idle address ID information 3 in the path routing table of N1.

At step S805, a response data packet F is determined by N1, the response data packet F carries the idle address ID information 3 in the path routing table of N1, idle address ID information 0 in a path routing table of M0, and the path creation ID information.

At step S806, the response data packet F is sent to M0 by N1.

At step S807, the idle address ID information 3 in the path routing table of N1 is stored by M0 in an idle position corresponding to the idle address ID information 0 in the path routing table of M0.

Figure 9:
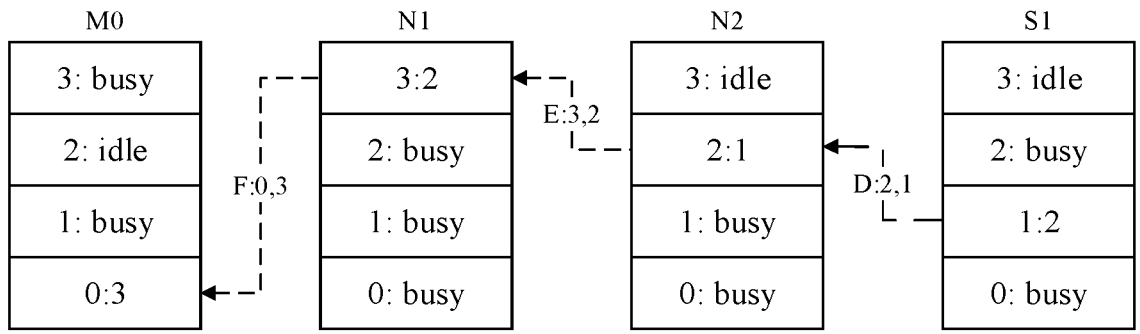
FIG. 9 is a schematic state diagram of still another path routing table according to an embodiment of the present disclosure.

The above process may also be represented by a schematic state diagram of the path routing tables of S1, N2, N1, and M0 shown in FIG. 9.

Figure 10:
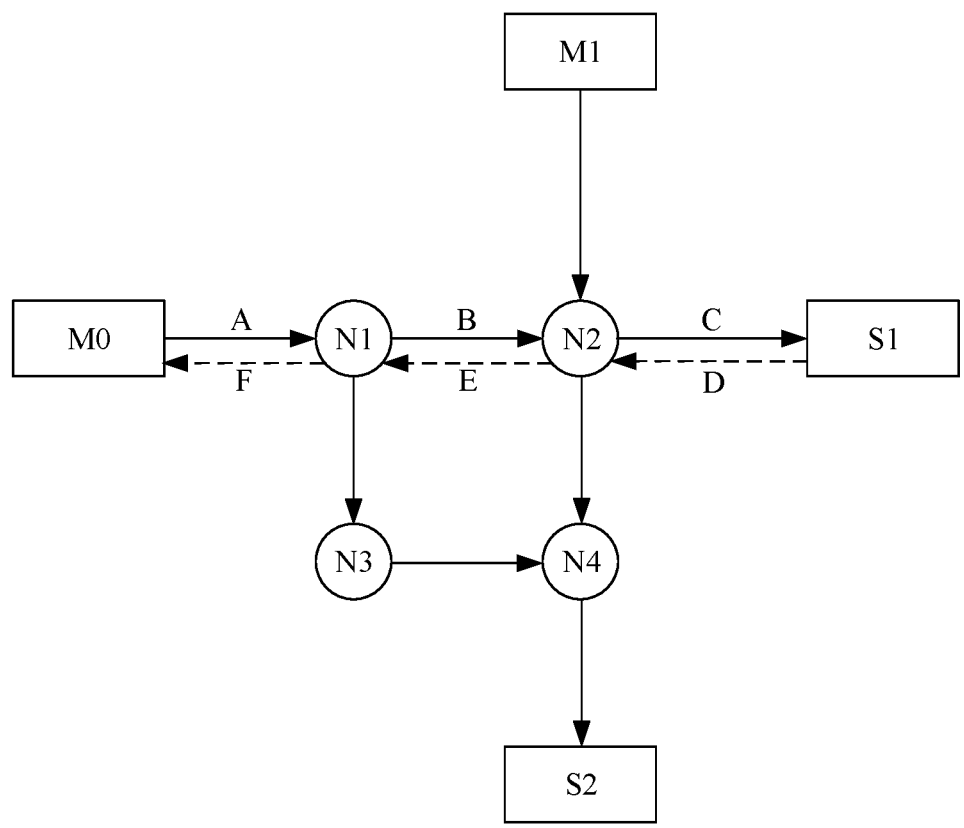
FIG. 10 is a schematic diagram of data transmission according to an embodiment of the present disclosure.

In the embodiments of the present disclosure, FIG. 10 also shows the transmission process of the path creation data packet and the response data packet in the above first and second implements.

In the embodiments of the present disclosure, a new path is successfully created through the above process, and thus the path routing table of each network node is also updated. Taking the first path routing table of the master data sending unit M0 (Table 1) as an example, it is assumed that the intermediate network node N1 is the outlet 1 of M0. When the above new path is created, the idle position 3 of N1 is occupied, and the configured path routing table is shown in Table 2:

TABLE 2

| address ID information | whether forwarded by outlet 1 | address ID information of outlet 1 | whether forwarded by outlet 2 | address ID information of outlet 2 |
|---|---|---|---|---|
| 0 | sending | 3 | sending | 2 |
| 1 | sending | 0 | not sending | 1 |
| 2 | sending/ not sending | 0/1/. . . | sending/ not sending | 0/1/. . . |
| 3 | not sending | 1 | not sending | 0 |
| . . . | . . . | . . . | . . . | . . . |

Where, the outlet 2 corresponding to the address ID information 0 is not shown in FIG. 10 of the embodiment of the present disclosure. It is assumed that there is a node, such as N5, having the corresponding address ID information 2.

Figure 11:
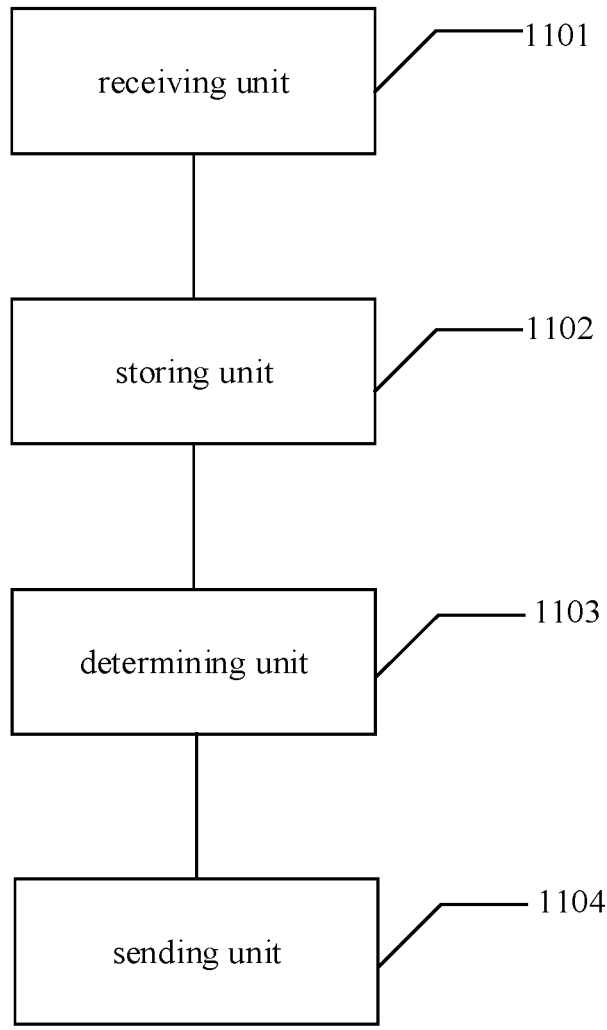
FIG. 11 is a schematic diagram of a path creation device for a network on chip according to an embodiment of the present disclosure.

FIG. 11 is a schematic diagram of a path creation device for a network on chip according to an embodiment of the present disclosure. As shown in FIG. 11, the path creation device for a network on chip includes: a receiving unit 1101, a storing unit 1102, a determining unit 1103, and a sending unit 1104. The receiving unit 1101 is configured to receive a first data packet sent by a first network node, the first data packet carries first idle address identification information, a destination network node address and path creation identification information, the first idle address identification information indicates a first idle position in a first path routing table of the first network node, and the path creation identification information indicates a creation of a path. The storing unit 1102 is configured to store the first idle address identification information in a second idle position in its second path routing table, and determine second idle address identification information. The determining unit 1103 is configured to determine a second data packet according to the second idle address identification information. The sending unit 1104 is configured to send the second data packet.

In an embodiment, the receiving unit is further configured to receive a third data packet sent by a third network node, the third data packet carries third idle address identification information, second idle address identification information and response identification information. The third idle address identification information indicates a third idle position in a third path routing table of the third network node, and the response identification information indicates a response to the path creation identification. The determining unit is further configured to determine the second idle position in the second path routing table according to the second idle address identification information. The storing unit is also configured to store the third idle address identification information in the second idle position in its second path routing table. The determining unit is further configured to determine a fourth data packet according to the second idle position. The sending unit is further configured to send the fourth data packet.

Figure 12:
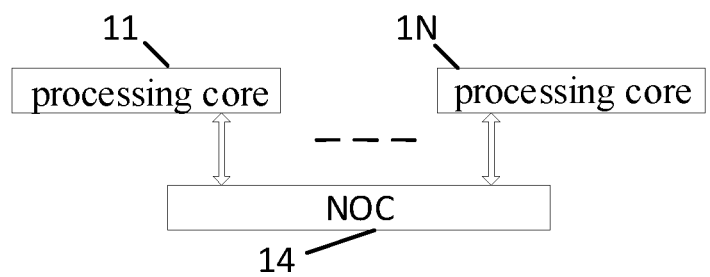
FIG. 12 is a schematic structural diagram of an electronic apparatus according to an embodiment of the present disclosure.

FIG. 12 is a schematic structural diagram of an electronic apparatus according to an embodiment of the present disclosure. As shown in FIG. 12, the electronic apparatus includes processing cores 11-1N and a Network on Chip (NOC) 14. The processing cores 11-1N are all connected to the NOC 14. The NOC 14 is configured to exchange data between the N processing cores and external data. The N processing cores store instructions, and the electronic apparatus performs the following operations according to the instructions: receiving, by a second network node, a first data packet sent by a first network node, the first data packet carrying first idle address identification information, a destination network node address and path creation identification information, the first idle address identification information indicating a first idle position in a first path routing table of the first network node, the path creation identification information indicating a creation of a path; storing, by the second network node, the first idle address identification information in a second idle position in its second path routing table, and determining second idle address identification information, the second idle address identification information being address information of the second idle position in the second network node; determining, by the second network node, a second data packet according to the second idle address identification information; and sending, by the second network node, the second data packet.

As those having ordinary skill in the art should anticipate, various aspects of the embodiments of the present disclosure may be implemented as a system, a method, or a computer program product. Therefore, various aspects of the embodiments of the present disclosure may be in the following forms: a complete hardware implementation, a complete software implementation (including firmware, resident software, microcode, etc.), or an implementation that combines software and hardware and may be generally referred to as "a circuits", "a module" or "a system" herein. In addition, various aspects of the embodiments of the present disclosure may be in the following forms: a computer program product implemented in one or more computer-readable media, the computer-readable medium includes computer-readable program codes implemented thereon.

Any combination of one or more computer readable media may be utilized. The computer-readable medium may be a computer-readable signal medium or a computer-readable storage medium. The computer-readable storage medium may be, for example, but not limited to, an electronic, magnetic, optical, electromagnetic, infrared, or semiconductor system, apparatus or device, or any appropriate combination thereof. More specific examples (non-exhaustive list) of the computer-readable storage media would include the following: an electrical connection with one or more wires, a portable computer floppy disk, hard disk, random access memory (RAM), read-only memory (ROM), erasable programmable read only memory (EPROM or flash memory), optical fiber, portable compact disk read only memory (CD-ROM), optical storage device, magnetic storage device, or any appropriate combination thereof. In the context of the embodiments of the present disclosure, the computer-readable storage medium may be any tangible medium that can contain or store a program used by an instruction execution system, apparatus or device, or a program used in conjunction with the instruction execution system, apparatus or device.

The computer-readable signal medium may include a propagated data signal having computer-readable program code implemented therein as in baseband or as a part of a carrier wave. Such propagated signal may be in any of a variety of forms, including but not limited to: electromagnetic, optical, or any suitable combination thereof. The computer-readable signal medium may be any of the following computer-readable media: which is not a computer-readable storage medium, and may communicate and propagate program used by the instruction execution system, apparatus or device, or used in conjunction with the instruction execution system, apparatus or device.

Any suitable medium including, but not limited to, wireless, wired, fiber optic cable, RF, etc. or any appropriate combination thereof may be used to transmit the program code implemented on the computer-readable medium.

The computer program code used to perform operations directed to various aspects of the embodiments of the present disclosure can be written in any combination of one or more programming languages, the programming languages including: object-oriented programming languages such as Java, Smalltalk, C++, etc.; and conventional process programming languages such as "C" programming language or similar programming languages. The program code can be executed as an independent software packet entirely on user's computer, partly on user's computer; partly on user's computer and partly on a remote computer; or entirely on the remote computer or server. In the latter case, the remote computer can be connected to the user's computer through any type of network including a local area network (LAN) or a wide area network (WAN), or can be connected with an external computer (for example, by using Internet of an Internet service provider).

The foregoing flowchart illustrations and/or block diagrams of the methods, apparatuses (systems) and computer program products according to the embodiments of the present disclosure describe various aspects of the embodiments of the present disclosure. It should be understood that each block of the flowchart illustrations and/or block diagrams and combinations of blocks in the flowchart illustrations and/or block diagrams can be implemented by computer program instructions. These computer program instructions can be provided to a processor of a general-purpose computer, a special-purpose computer, or other programmable data processing apparatus to generate a machine, so that the instructions (executed by the processor of the computer or other programmable data processing apparatus) create a device for implementing functions/actions specified in the flowcharts and/or block diagrams or blocks.

These computer program instructions may also be stored in a computer-readable medium that can direct a computer, other programmable data processing apparatus, or other apparatuses to operate in a specific manner, so that the instructions stored in the computer-readable medium generate articles for implementing the functions/actions specified in the flowcharts and/or block diagrams or blocks.

The computer program instructions may also be loaded on a computer, other programmable data processing apparatus or other apparatuses, so that a series of operable steps are executed on the computer, other programmable apparatus or other apparatuses to generate a computer-implemented process, so that instructions executed on a computer or other programmable apparatus to provide a process for implementing functions/actions specified in the flowchart and/or block diagrams or blocks.

The foregoing descriptions are only preferred embodiments of the present disclosure and are not used to limit the present disclosure. For those having ordinary skill in the art, the present disclosure may have various modifications and changes. Any modification, equivalent replacement, improvement, etc. made within the spirit and principle of the present disclosure should be included in the protection scope of the present disclosure.

What is claimed is:

1. A path creation method for a network on chip, comprising:

receiving, by a second network node, a first data packet sent by a first network node, wherein the first data packet carries first idle address identification information, a destination network node address and path creation identification information, the first idle address identification information indicates a first idle position in a first path routing table of the first network node, the path creation identification information indicates a creation of a path;

storing, by the second network node, the first idle address identification information in a second idle position in its second path routing table, and determining second idle address identification information, wherein the second idle address identification information is address information of the second idle position in the second network node;

determining, by the second network node, a second data packet according to the second idle address identification information;

sending, by the second network node, the second data packet;

receiving, by the second network node, a third data packet sent by a third network node, wherein the third data packet carries third idle address identification information, the second idle address identification information and response identification information, the third idle address identification information indicates a third idle position in a third path routing table of the third network node, the response identification information indicates a response to the path creation identification;

determining, by the second network node, the second idle position in the second path routing table according to the second idle address identification information;

storing, by the second network node, the third idle address identification information in the second idle position in the second path routing table;

determining, by the second network node, a fourth data packet according to the second idle position; and sending, by the second network node, the fourth data packet.

2. The method of claim 1, wherein before the step of storing, by the second network node, the first idle address identification information in the second idle position in its second path routing table, and the determining the second idle address identification information, the method further comprises:

determining, by the second network node, the second idle position in the second path routing table.

3. The method of claim 1, wherein the step of determining, by the second network node, the second data packet according to the second idle address identification information comprises:

determining, by the second network node, the second idle address identification information, the destination network node address and the path creation identification information as the second data packet.

4. The method of claim 1, wherein the step of sending, by the second network node, the second data packet comprises:

determining, by the second network node, a transmission direction of the second data packet according to the destination network node address; and sending, by the second network node, the second data packet according to the transmission direction.

5. The method of claim 1, wherein the step of determining, by the second network node, the fourth data packet according to the second idle position comprises:

determining, by the second network node, the fourth data packet according to the first idle address identification information stored in the second idle position.

6. The method of claim 5, wherein the step of determining, by the second network node, the fourth data packet according to the first idle address identification information stored in the second idle position comprises:

determining, by the second network node, the first idle address identification information, the second idle address identification information and the response identification information as the fourth data packet.

7. The method of claim 1, wherein the path routing table is stored in a register or in a random access memory.

8. A path creation device for a network on chip, comprising:

a receiving unit configured to receive a first data packet sent by a first network node, wherein the first data packet carries first idle address identification information, a destination network node address and path creation identification information, the first idle address identification information indicates a first idle position in a first path routing table of the first network node, the path creation identification information indicates a creation of a path;

a storing unit configured to store the first idle address identification information in a second idle position in its second path routing table, and determine second idle address identification information, wherein the second idle address identification information is address information of the second idle position in the second path routing table;

a determining unit configured to determine a second data packet according to the second idle address identification information; and a sending unit configured to send the second data packet, wherein the receiving unit is further configured to receive a third data packet sent by a third network node, wherein the third data packet carries third idle address identification information, the second idle address identification information and response identification information, the third idle address identification information indicates a third idle position in a third path routing table of the third network node, the response identification information indicates a response to the path creation identification;

the determining unit is further configured to determine the second idle position in the second path routing table according to the second idle address identification information;

the storing unit is further configured to store the third idle address identification information in the second idle position in the second path routing table;

the determining unit is further configured to determine a fourth data packet according to the second idle position; and the sending unit is further configured to send the fourth data packet.

9. An electronic apparatus, comprising:

a plurality of processing cores; and a network on chip configured to exchange data between the plurality of processing cores and external data;

wherein the plurality of processing cores store instructions, and the electronic apparatus performs the method of claim 1 according to the instructions.

10. A non-transitory computer-readable storage medium storing a computer program instruction thereon, wherein the computer program instruction, when executed by a processor, causes the processor to implement the method of claim 1.

* * * * *